(12) United States Patent
Eldada et al.

(10) Patent No.: US 6,824,934 B2
(45) Date of Patent: Nov. 30, 2004

(54) ONE STEP LASER FABRICATION OF POLYMER WAVE-GUIDED STRUCTURES HAVING VARYING WIDTH AND HEIGHT, AND THEIR APPLICATION TO PIGTAILING OF OPTICAL FIBERS

(75) Inventors: Louay Eldada, Acton, MA (US); James T. Yardley, Morristown, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/952,200

(22) Filed: Sep. 14, 2001

(65) Prior Publication Data

US 2003/0054092 A1 Mar. 20, 2003

(51) Int. Cl.$^7$ .................................................. G02B 6/10
(52) U.S. Cl. .......................................... 430/7; 430/945
(58) Field of Search ................................ 430/321, 945; 385/43

(56) References Cited

U.S. PATENT DOCUMENTS

| | | | | |
|---|---|---|---|---|
| 4,886,538 A | * | 12/1989 | Mahapatra | ................. 65/30.13 |
| 5,071,217 A | | 12/1991 | Birch | .......................... 385/33 |
| 5,175,788 A | | 12/1992 | Miura et al. | ................. 385/131 |
| 5,402,511 A | | 3/1995 | Malone et al. | ................. 385/43 |

OTHER PUBLICATIONS

Robert R. Krchnavek, et al., "Laser Direct Writing of Channel Waveguides Using Spin–On Polymers", J. Appl. Phys. 66 (11), Dec. 1, 1989, 1989 American Institute of Physion, pp. 5156–5160.

* cited by examiner

*Primary Examiner*—John A. McPherson

(57) ABSTRACT

The invention relates to lithographically formed, tapered waveguides connectable to optical fibers. A tapered waveguide is formed by imagewise exposing, in an oxygen containing atmosohere, and developing a lithographic composition on a substrate. Exposure is conducted by a converging beam of laser light which has a greater intensity a the bottom surface of the coating composition, a lesser intensity at the top surface, and a gradually decreasing intensity from the bottom surface to the top surface of the coating composition. Either the substrate is moved with respect to the converging beam, or the converging beam is moved with respect to the substrate along a linear path. Either the moving is done at a gradually increasing or gradually decreasing velocity or one gradually increases or decreases the intensity of the beam of laser light along the substrate. After developing and removing the non-polyrnerized portion of the coating composition, a tapered waveguide is fornnd on the substrate. The tapered waveguide may be attached to an optical fiber.

25 Claims, No Drawings

ONE STEP LASER FABRICATION OF POLYMER WAVE-GUIDED STRUCTURES HAVING VARYING WIDTH AND HEIGHT, AND THEIR APPLICATION TO PIGTAILING OF OPTICAL FIBERS

BACKGROUND OF THE INVENTION

1. Field of the Invention

The present invention relates to planar optical waveguides, and particularly to lithographically formed, tapered waveguides connectable to optical fibers.

2. Technical Background

Optical waveguide structures are used to build integrated optical circuits that route and control optical signals in a optical fiber communication system. In optical communication systems, messages are transmitted at infrared optical frequencies by carrier waves that are generated using sources such as lasers and light-emitting diodes. There is interest in these optical communication systems because they offer several advantages over electronic communications systems using copper wires or coaxial cable. They have a greatly increased number of channels of communication, as well as the ability to transmit messages at much higher speeds than electronic systems.

The operation of an optical waveguide is based on the fact that when a core medium which is transparent to light is surrounded or otherwise bounded by another cladding medium having a lower refractive index, light introduced along the core medium's axis is highly reflected at the boundary with the surrounding cladding medium, thus producing a light-guiding effect.

One method used to form an optical waveguide device involves the use of standard photolithographic processes. Lithographic processes are used to define a pattern in a light-sensitive, photopolymer-containing layer deposited on a substrate. This layer may itself consist of several layers composed of the same or different polymeric materials having dissimilar refractive indices, to form a core, overcladding, and undercladding layers or structures.

Passive polymer optical waveguides are used to form interconnections between optical information processing devices or interconnections between such devices and other external optical communication links such as glass optical fibers. They may also be used to create passive optical devices such as bends, splitters, combiners, couplers, and the like. In some instances, it is desired that these waveguiding structures have varying dimensions in different directions in order to efficiently intercept other optical elements or have a certain beam profile. Such may be done by tapering the waveguide. This tapering, especially when thickness variation is desired, is not obtainable with conventional mask fabrication techniques where exposure power from a large area UV lamp is constant, and the incident light is unfocused. However, using direct writing lasers, the focal plane and the intensity of the laser beam as well as the scanning speed of translating a target relative to the laser beam, can be adjusted to produce tapered structures in a single step.

In order to connect waveguides to optical fibers, a pigtailing technique is required. Pigtailing refers to attaching one light carrier to another light carrier, such as attaching a waveguide to an optical fiber. Pigtailing is especially difficult with single-mode structures where a small (1–2 $\mu$m) misalignment can result in serious coupling loss. This may be due to the small dimensions involved or the fact that the core of a single-mode fiber can be displaced from the exact center of the fiber. Typically, these problems are circumvented by active fiber alignment where an operator displaces the fiber relative to the waveguide while monitoring the power output and attaches the fiber when maximum power is detected. This typical process is time consuming and expensive. The present invention provides a technique for pigtailing waveguides with relaxed tolerances. This is done by expanding the height and width of a waveguide which allows a relaxation of the tolerance requirement.

The invention produces varying dimension tapered polymer waveguides by laser direct writing in a uniform thickness photopolymerizable layer. Photopolymerizable compositions are direct written by a laser beam while varying the exposure dose directed to the composition. This may be either by controlling the laser power or by controlling the scanning speed of a target substrate with respect to the laser beam. Focusing the laser beam on the substrate surface allows one to grow waveguides from the bottom up as the substrate is scanned or the laser power is varied. This bottom up polymerization is obtained despite the fact that the exposure is from the direction of the top of the layer. This is done by focusing of the laser beam at the bottom of the polymerizable layer where the beam has a higher power density than at the top. This result is also due to self-guiding effects, since as the laser beam travels through the polymerizable layer, it changes the index of refraction of the material in its path. This results in yet sharper focusing of the beam, resulting in further increases in the power density at the bottom of the layer. Thus one can produce a waveguide having any desired thickness from zero through the total thickness of the starting unexposed layer.

SUMMARY OF THE INVENTION

The invention provides a process for forming a tapered waveguide on a substrate. An actinic radiation polymerizable coating composition is applied on a substrate. The coating composition has a bottom surface adjacent to the substrate and a top surface spaced from the bottom surface and the coating composition is at least partially transparent to laser light. The coating composition is imagewise exposed, in an oxygen containing atmosphere, to sufficient actinic radiation to at least partially polymerize the coating composition and form a polymerized portion and a non-polymerized portion of the coating composition by directing a converging beam of laser light onto and through the coating composition. The beam of converging laser light has a greater intensity at the bottom surface of the coating composition, a lesser intensity at the top surface of the coating composition, and a gradually decreasing intensity from the bottom surface of the coating composition to the top surface of the coating composition. Then either the substrate is moved with respect to the converging beam or the converging beam is moved with respect to the substrate along a linear path, or a combination may be used. One then either conducts the moving at a gradually increasing or gradually decreasing velocity from a first position on the substrate to a second position on the substrate; or gradually increases or decreases the intensity of the beam of laser light from a first position on the substrate to a second position on the substrate; or a combination of the two may be used. After developing the coating composition with a liquid developer and removing the non-polymerized portion of the coating composition a tapered waveguide is formed on the substrate.

The invention also provides a process for attaching an optical fiber having a core with a first cross sectional area to an optical fiber or waveguide having a core with a second cross sectional area which comprises forming a tapered waveguide on a substrate by first providing an actinic radiation polymerizable coating composition on a substrate. The coating composition has a bottom surface adjacent to the substrate and a top surface spaced from the bottom surface and the coating composition is at least partially transparent to laser light. One then imagewise exposes, the coating composition, in an oxygen containing atmosphere, to sufficient actinic radiation to at least partially polymerize the coating composition and form a polymerized portion and a non-polymerized portion of the coating composition by directing a converging beam of laser light onto and through the coating composition. The beam of converging laser light has a greater intensity at the bottom surface of the coating composition and a lesser intensity at the top surface of the coating composition, and a gradually decreasing intensity from the bottom surface of the coating composition to the top surface of the coating composition. One then either moves the substrate with respect to the converging beam or moves the converging beam with respect to the substrate along a linear path; or a combination may be used. One either conducts the moving at a gradually increasing or gradually decreasing velocity from a first position on the substrate to a second position on the substrate; or one gradually increases or decreases the intensity of the beam of laser light from a first position on the substrate to a second position on the substrate; or a combination of the two may be used. After developing the coating composition with a liquid developer and removing the non-polymerized portion of the coating composition forming a tapered waveguide is formed on the substrate. The waveguide has a first end having a first cross sectional area and a second end having a second cross sectional area. Then at least one optical fiber is attached to at least one end of the waveguide.

DETAILED DESCRIPTION OF THE INVENTION

The invention provides a process for forming optical waveguides having tapering in both the height and width dimensions. The waveguide of the invention comprises a substrate, an optional polymeric undercladding layer, an optional buffer layer on a surface of the substrate or undercladding; a pattern of a light-transmissive polymeric core formed directly on the surface of the substrate, undercladding or buffer layer; and a polymeric overcladding layer on the top surface and on the side walls of the core.

In one embodiment of the invention, a polymeric undercladding and/or buffer layer is initially deposited onto a surface of a substrate. The substrate may be any material on which it is desired to establish a waveguide including materials such as silicon, silicon oxide, gallium arsenide, silicon nitride, glass, quartz, plastics, ceramics, crystalline materials and the like. The substrate may or may not contain other devices, for example, topographical features such as grooves or electrical circuits or electro-optic devices such as laser diodes.

Since the substrates may be absorbing at optical wavelengths of importance to telecommunications, any portion of the propagating light that reaches the substrate is subject to absorption. Absorption of light by the substrate leads to an undesirable polarization-dependent loss of optical power from the propagating signal. The purpose of an optional intermediate undercladding and/or buffer layer is to restrict the penetration of the light into the substrate and to prevent any significant amount of the light from reaching the substrate. In order for the undercladding or buffer to function as desired, it is necessary for its index of refraction to be significantly below that of the core. The polymeric undercladding or buffer layer may be applied in a number of different ways known in the art, such as spin coating, dip coating, slot coating, roller coating, doctor blading, liquid casting or the like. The undercladding and/or buffer layer may comprise photopolymerizable compounds, such as acrylate compounds. Useful acrylate compounds are described below. Once the layer of photopolymerizable material is deposited onto the surface of the substrate, it is at least partially polymerized by an overall exposure to actinic radiation. Usually the undercladding and/or buffer layer have a total thickness of from about 3 microns to about 500 microns. Total thicknesses of from about 5 microns to about 100 microns are suitable and especially those from about 8 to about 30 microns.

In order to promote adhesion between subsequently applied polymer layers and in some cases to control the gradation of index of refraction at the interface, the applied layers can be purposefully left substantially undercured in order to promote the interpenetration of monomers and the formation of covalent bonds between layers. After the undercladding and/or buffer layer is deposited and partially polymerized, a core is formed on the upper surface. The core is formed by depositing a light-transmissive, photosensitive core layer onto the surface. A layer of a core photopolymerizable composition is deposited using well known techniques such as spin coating, dip coating, slot coating, roller coating, doctor blading, liquid casting or the like.

The photosensitive core layer is then imagewise exposed to actinic radiation by a direct write laser. The core coating composition layer is imagewise exposed to a pattern to at least partially polymerize the core coating composition and form a polymerized portion and a non-polymerized portion by directing a converging beam of laser light onto and through the coating composition. The beam of converging laser light is focused at the bottom of the layer, such as with a converging lens, such that the light has a greater intensity at the bottom surface of the coating composition, a lesser intensity at the top surface of the coating composition, and a gradually decreasing intensity from the bottom surface of the coating composition to the top surface of the coating composition. The bottom of the region which will form a waveguide is thus more fully polymerized than the top of this region, with a graduated degree of polymerization therebetween. In the usual case, the exposure is conducted in an oxygen containing atmosphere so that some degree of polymerization of the polymerizable composition is inhibited by oxygen quenching at the uppermost part of the exposed region. Then, the beam and the substrate are moved along a linear path with respect to one another. This may be done either by moving the substrate with respect to the beam or moving the beam with respect to the substrate. In one embodiment, a tapering of the exposure dose may be accomplished by conducting the moving at a gradually increasing or gradually decreasing velocity as the substrate or beam move from a first position on the substrate to a second position on the substrate with respect to one another. In one embodiment the beam is held stationary and the beam is swept, and in another embodiment, the beam is held stationary and the substrate is translated. The relative motion may be conducted in a series of steps or continuously.

An another embodiment, tapering of the exposure dose may be done by gradually increasing or decreasing the intensity of the beam of laser light as the substrate and beam move from a first position on the substrate to a second position on the substrate with respect to one another. After developing to remove the less exposed and non-exposed portions of the polymerizable composition material, a patterned, tapered, light-transmissive waveguide core is formed on the substrate. The tapering is in both height and width. It is also possible to combine varying the intensity of the laser beam as stated in this paragraph with the translation changes mentioned in the prior paragraph to produce the subject tapered waveguide.

Usually the core layer has a cross-sectional width and height which each range from about 1 $\mu$m to about 70 $\mu$m, more suitably the core has a cross-sectional width and height which each range from about 3 $\mu$m to about 10 $\mu$m. It is also usual that, at any point along the taper, the width of the core is no more than about twice the height of the core, and the height is no more than about twice the width. Further, although the height and width of the core vary along the taper, usually the core has about the same height and width dimensions at any given point along the taper. In order to minimize coupling losses from a tapered waveguide to standard single-mode glass fiber, for example, to SMF-28 sold by Corning Incorporated, the end of the tapered waveguide coupled to the fiber preferably has a core cross-sectional dimension between about 6×6 microns and about 8×8 microns. Materials for the core layer include polymerizable acrylate materials which are described in detail below.

After the core is formed, an overcladding layer is deposited onto a top surface of the core and onto side walls of the core. The photopolymerizable overcladding layer may also be applied via the above mentioned techniques and then overall exposed to actinic radiation. The overcladding layer can be any material capable of keeping applied light confined in the core and in the regions immediately surrounding the core and may comprise polymerizable acrylate compounds which are described in detail below. In one embodiment the overcladding layer usually has a thickness measured from the top of the core of from about 3 to about 30, more usually from about 5 to about 20, and more suitably from about 8 to about 15 microns.

The waveguides are formed using photopolymerizable optical materials that include mixtures of monomeric and oligomeric components which are blended to provide a desired index of refraction for each layer. The particular index of refraction for each layer has a significant effect on the performance of the waveguide. When selecting the photopolymerizable compounds to be used in each of the core, undercladding, buffer and overcladding layers, it is important that the core has an index of refraction which is greater than an index of refraction of the overcladding layer, the buffer and the undercladding.

Generally, the refractive index of the core is in the range of from about 0.1% to about 10% higher than the refractive index of the surrounding cladding or other directly adjacent material layers. More usually, the refractive index of the core is about 0.4% to about 3.5% higher than the surrounding cladding or other directly adjacent material layers.

The compositions used to form each of the buffer, overcladding, undercladding and core each may comprise a photopolymerizable compound and a photoinitiator. The photopolymerizable compound may be a monomer, oligomer or polymer which is an addition polymerizable, non-gaseous (boiling temperature above 30° C. at normal atmospheric pressure), ethylenically unsaturated compound containing at least one terminal ethylenically unsaturated group, and is capable of forming a high molecular weight polymer by free radical initiated, chain propagating addition polymerization. Such compounds are well known in the art. In order to make planar polymeric optical waveguides, it is necessary to finely control the refractive index of various core and cladding layers. This can be achieved by tailoring the structure of the monomer used in a particular coating layer to achieve the desired refractive index. In practice, it is easier to blend several miscible monomers of different refractive indexes together to get the desired refractive index needed. The monomers are selected such that the formed polymerized element has the desired refractive index as described above. The determination of the refractive index for the particularly selected polymerized compositions are easily determinable by those skilled in the art. Multifunctional acrylate monomers are suitable. The generalized structure of the multifunctional acrylates is given below:

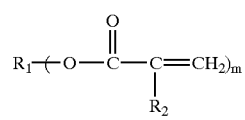

For the core, m may range from 1 to about 6; $R_2$ is H or $CH_3$, and $R_1$ is a linkage of aliphatic, aromatic or aliphatic and aromatic mixed organic molecular segments. Suitably $R_1$ is an alkylene, alkylene oxide, arylene oxide, aliphatic polyether or polyester moiety and $R_2$ is preferably H. To ensure solvent resistance of the film and high contrast photolithography, crosslinked polymers and therefore multifunctional acrylate monomers (m$\geq$2) are suitable. It is also desirable to reduce stress induced scattering optical loss of the final waveguiding device by using flexible, low glass transition temperature (Tg) polymers. It is known in the art that the glass transition temperature (Tg) of a crosslinked polymer depends on the crosslinking density and the structure of the linkage between crosslinking points. It is also known that both low crosslinking density and flexible linkage require a low Tg. To ensure low crosslinking density, monomers with 1≦m≦3, ideally m=2, and long linkage segments between two ethylenically unsaturated functionalities are useful. For this invention, long linkage segments are those which have an average molecular chain length of at least about 4 carbon atoms or larger and suitably 6 or larger. Suitable flexible linkage structures include alkylenes with chain length larger than about 3 carbon atoms, for example, poly(ethylene oxide), poly(propylene oxide), ethoxylated bisphenol A, polyethers, thioethers, aliphatic and aromatic hydrocarbons, ethers, esters and polysiloxanes, etc. These may optionally be substituted with any pendant group which does not detract from the ability of the polymerizable compound to photopolymerize or add undue loss at the light wavelengths of interest, e.g., wavelengths of 1.31 and 1.52–1.63 microns for telecommunications. Suitable substitutes nonexclusively include alkyl, aryl, alkoxy and sulfoxide groups, and similar groups known in the art. To ensure high resistance to thermal degradation and discoloration, thermally stable molecular structures of $R_1$ are suitable. Such $R_1$ segments should be free of thermally susceptible moieties such as aromatic urethane and amide acrylates, glycerol di- and triacrylate, 1,4-cyclohexane diacrylate, bisacrylates of polyethylene glycols having an average molecular weight from 100 to 1500, and mixtures of the above compounds. Multifunctional acrylate oligomers include, but are not limited to acrylated epoxies, acrylated polyurethanes and acrylated polyesters. Photopolymerizable compounds include aryl acrylates. Illustrative of such aryl acrylate monomers are aryl diacrylates, triacrylates and tetraacrylates as for example di, tri and tetraacrylates based on benzene, naphthalene, bisphenol A, biphenylene, methane biphenylene, trifluoromethane biphenylene, phenoxyphenylene and the like. The aryl acrylate monomers may be multifunctional aryl acrylates and more usually aryl acrylate monomers are di, tri and tetra acrylates based on the bisphenol-A structure. Usual aryl acrylate monomers are alkoxylated bisphenol-A diacrylates such as ethoxylated bisphenol-A di-acrylate, propoxylated bisphenol A diacrylates and ethoxylated hexafluorobisphenol-A diacrylates. The aryl acrylate monomers of choice are ethoxylated bisphenol-A diacrylates. Desired polymerizable components are monomers having the structure (I):

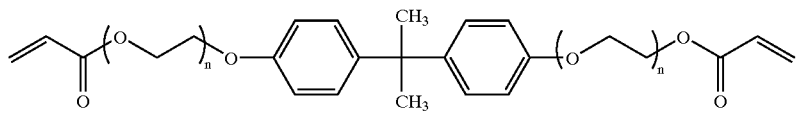

groups. To ensure low birefringence, $R_1$ linkages with low stress optic coefficient and optical polarizability are usual.

For the overcladding layer, the acrylate is also as described above. However, the average molecular chain length between ethylenically unsaturated functionalities may be about 6 carbon atoms or longer, usually 8 or longer and more suitably 12 or longer. Suitable flexible linkage structures include alkylenes with chain length larger than 6 carbon atoms, for example, poly(ethylene oxide), poly (propylene oxide) and ethoxylated bisphenol A. In an embodiment of the invention, materials for each of the buffer, core layer and overcladding layer also include polymerizable esters and partial esters of acrylic acid and of aromatic and aliphatic polyols containing 2 to 30 carbon atoms. The partial esters and esters of polyoxyalkylene glycols are also suitable. Examples are ethylene glycol diacrylate, diethylene glycol diacrylate, triethylene glycol diacrylate, tetraethylene glycol diacrylate, polyethylene glycol diacrylates and polypropylene glycol diacrylates having an average molecular weight in the range from 200 to 2000, propylene glycol diacrylate, dipropylene glycol diacrylate, ($C_2$ to $C_{40}$)alkane diol diacrylates such as hexanediol diacrylate, and butanediol diacrylate, tripropylene glycol diacrylate, trimethylolpropane triacrylates, ethoxylated trimethylolpropane triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, sorbitol triacrylate, sorbitol tetraacrylate, sorbitol pentaacrylate, sorbitol hexaacrylate, oligoester In one embodiment, for the core, n is about 10 or less, usually about 4 or less and more suitably about 2 or less. In one embodiment, for the cladding layers, n is about 2 or more, usually about 4 or more and more suitably about 10 or more. Also useful are acrylate containing copolymers which are well known in the art. In an embodiment, the cladding layer comprises a polymerizable component which has the ethoxylated bisphenol-A disacrylate structure (I) shown above wherein 1≦n≦20, usually 4≦n≦15, and more suitably 8≦n≦12. The polymerizable compositions may be multifunctional fluorinated (meth)acrylates, particularly those based on the following structures:

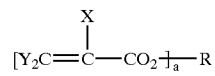

Where Y is H or D; X is H, D, F, Cl, or $CH_3$, and a is an integer from 2 to 4

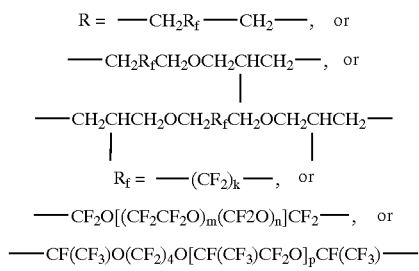

Where k, m, n, and p are integers

These materials produce waveguides with propagation losses of as little as 0.17 dB/cm at 1550 nanometers. The glass transition temperatures (Tg) of these materials can be easily selected to be below the operating temperature of thermo-optic devices. Useful fluorinated (meth)acrylates include, for example, a tetraacrylate F60TA made from the polyol Fluorolink® T, which is commercially available from Ausimont S.p.A. of Milan ITALY, according to the reaction which is shown below:

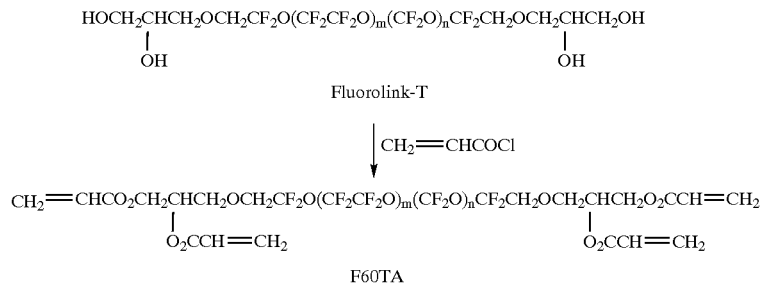

Other multifunctional acrylates include C6DIACRY from Exfluor Research Corporation, Round Rock, Tex.:

L-12043 from the 3M Company of Saint Paul, Minn.:

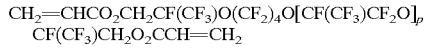

L-9367 similarly from the 3M Company:

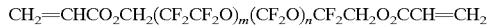

Although each of the buffer, overcladding and core may be comprised of structurally similar compositions, in order for each of the buffer and the overcladding to have a refractive index which is lower than the refractive index of the core, they must each have different chemical compositions for any individual application. For example, the buffer layer composition may have a similar Tg property as the cladding layer, but need not be the identical composition. The photopolymerizable materials and processing conditions are selected such that the Tg of the polymerized buffer ranges from about 60° C. or less, usually about 40° C. or less and more suitably about 25° C. or less.

It is a feature of the present invention that the photopolymerizable compounds to be used in the waveguide core produce a core which after polymerization has a glass transition temperature of about 80° C. or less and suitably about 50° C. or less. It is a feature of the present invention that the photopolymerizable compounds to be used in the waveguide cladding layer produce a cladding layer which after polymerization have a glass transition temperature of about 60° C. or less, usually about 40° C. or less and more suitably about 25° C. or less. The particular Tg may be easily obtained by the skilled artisan by characterization and selection of the polymerizable component. This depends on such factors as the molecular weight, number of sites of unsaturation and crosslink density of the polymerizable component. A single polymerized component may itself have the requisite Tg, or the polymerizable component may be tailored by blending mixtures of polymerizable monomer, oligomers and/or polymers having the desired Tg. The Tg may also be controlled by varying the exposure time and temperatures at which polymerization is conducted.

The photopolymerizable compound is present in each overall photopolymerizable composition in an amount sufficient to photopolymerize upon exposure to sufficient actinic radiation. The amount of the photopolymerizable compound in the composition may vary widely and amounts normally used in photopolymerizable compositions for use in the preparation of photopolymers for use as the light-transmissive element of light-transmissive devices may be used. The amount of photopolymerizable compound is generally used in an amount of from about 35 to about 99.9% by weight of the composition. Usually the photopolymerizable compound is present in the overall composition in an amount of from about 80% to about 99.5% by weight, and more suitably from about 95 to about 99% based on the weight of the overall composition.

Each light-sensitive composition further comprises at least one free radical generating photoinitiator which photolytically generates free radicals. Usually the photoinitiator is a free radical generating addition polymerization initiator activated by actinic light and is thermally inactive at temperatures in the range of about 20° C. to about 80° C., and particularly at room temperatures (18–30° C.). Any photoinitiator which is known to photopolymerize acrylates can be used. Photoinitiators nonexclusively include quinoxaline compounds; vicinal polyketaldonyl compounds, alpha-carbonyls; acyloin ethers; triarylimidazolyl dimers; alpha-hydrocarbon substituted aromatic acyloins; polynuclear quinones; and s-triazines as are known in the art.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Photoinitiators also include 1-hydroxycyclohexylphenyl ketone (Irgacure® 184), benzoin, benzoin ethyl ether, benzoin isopropyl ether, benzophenone, benzodimethyl ketal (Irgacure 651), 2,2-diethyloxy acetophenone, 2-hydroxy-2-methyl-1-phenylpropan-1-one (Darocur® 1173), available from E. Merck of Darmstadt, Germany; 1-[4-(2-hydroxyethoxy)phenyl]-2-hydroxy-2-methylpropan-1-one (Darocur® 2959), 2-methyl-1-[(4-methylthio)phenyl]-2-morpholinopropan-1-one (Irgacure® 907), 2-benzyl-2-dimethylamino-1-(4-morpholinophenyl)-butan-1-one (Irgacure® 369), poly{1-[4-(1-methylvinyl)phenyl]-2-hydroxy-2-methyl-propan-1-one} (Esacure KIP), [4-(4-methylphenylthio)phenyl]phenylmethanone (Quantacure® BMS) from Great Lake Fine Chemicals Limited Of London, England, and di-campherquinone. The most suitable photoinitiators are those which tend not to yellow upon irradiation. Such photoinitiators include benzodimethyl ketal (Irgacure® 651), 2-hydroxy-2-methyl-1-phenylpropan-1-one (Darocur® 1173), 1-hydroxy-cyclohexyl-phenyl ketone (Irgacure® 184), and 1-[4-(2-hydroxyethoxy)phenyl]-2-hydroxy-2methyl -propan-1-one (Darocur 2959). Fluorolink®-T and C6DIACRYL are sufficiently miscible with most conventional photoinitiators that can be used for UV curing. For the more highly fluorinated multifunctional acrylates, such as materials L-12043 and L-9367 from 3M, a fluorinated photoinitiator may be used.

The free radical generating photoinitiator is present in each photopolymerizable composition in an amount sufficient to effect photopolymerization of the photopolymerizable compound upon exposure to sufficient actinic radiation. The photoinitiator is generally present in an amount of from about 0.01% to about 10% by weight of the overall composition, or more usually from about 0.1% to about 6% and more suitably from about 0.5% to about 4% by weight based on the total weight of the composition.

Other additives may also be added to the photosensitive compositions depending on the purpose and the end use of the light-sensitive compositions. Examples of these include solvents, antioxidants, photostabilizers, volume expanders, fillers such as for example silica, titania, glass spheres and the like (especially when in the nanoscale regime, that is, having a particle size less than about 100 nm), dyes, free radical scavengers, contrast enhancers, nitrones and UV absorbers. Antioxidants include such compounds as phenols, and particularly hindered phenols including Irganox® 1010 from Ciba-Geigy Corporation Corporation of Tarrytown N.Y.; sulfides; organoboron compounds; organophosphorous compounds; and N,N'-hexamethylenebis(3,5-di-tert-butyl-4-hydroxyhydrocinnamamide), available from Ciba-Geigy under the tradename Irganox® 1098. Photostabilizers, and more particularly hindered amine light-stabilizers, include but are not limited to poly[(6-morpholino-s-triazine-2,4-diyl)[(2,2,6,6,-tetramethyl-4-piperidyl)imino]-hexamethylene [(2,2,6,6,-tetramethyl-4-piperidyl)imino)] available from Cytec Industries of Wilmington, Del. under the tradename "Cyasorb® UV-3346." Volume expanding compounds include such materials as the spiral monomers known as Bailey's monomer. Examples of dyes include methylene green, methylene blue, and and similar dyes known in the art. Suitable free radical scavengers include oxygen, hindered amine light-stabilizers, hindered phenols, 2,2,6,6-tetramethyl-1-piperidinyloxy free radical (TEMPO), and and similar scavangers known in the art. Suitable contrast enhancers include other free radical scavengers such as nitrones. UV absorbers include benzotriazole, hydroxybenzophenone, and similar scavangers known in the art. These additives may be included in quantities, based upon the total weight of the composition, from about 0% to about 6%, and usually from about 0.1% to about 1%. All components of the overall composition are in admixture with one another, and most suitably in a substantially uniform admixture.

While the core must be formed by the direct laser write technique described above, the undercladding, buffer and overcladding may be polymerized either by exposure to laser irradiation, or, more usually, by an overall blanketing exposure from an ultraviolet radiation source.

The photopolymer of the invention is conventionally prepared by exposing the polymerizable composition to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light such as light from a laser. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art.

Sources of actinic radiation and the wavelength of the radiation may be varied widely, and any conventional wavelengths and sources can be used. In one embodiment, the photochemical excitation can be carried out with relatively short wavelength (i.e., high energy) radiation so that exposure to radiation normally encountered before processing (e.g., room lights) will not prematurely polymerize the polymerizable material. Thus, exposure to ultraviolet light (300–400 nm wavelength) is convenient. Also, exposure by deep ultraviolet light (190–300 nm wavelength) is useful. Convenient sources are high pressure mercury-xenon arc lamps fitted with appropriate optical filters to select the desired wavelengths for processing. Also, short wavelength coherent radiation is useful for the practice of this invention. When direct write laser exposure is used, an argon ion laser operating in the UV mode at several wavelengths near 350 nm is desirable. Also, a frequency-doubled Argon ion laser with output near 257 nm wavelength is highly desirable. Alternatively, the processing can utilize a multiphoton process initiated by a high intensity source of actinic radiation such as a laser. Exposure time normally varies from a few seconds to about 10 minutes. While temperatures can usually range from about 10° C. to about 60° C., room temperature is more suitable. Additionally, these materials could be cured thermally through the use of peroxides or other thermal initiators.

Where a directed or focused laser beam is used, it intersects only a small area of the photopolymerizable material film surface. This is achieved by using an aperture that passes only a small portion of the laser beam or by using a converging lens to focus the laser beam to the desired illumination area. The pattern of the desired core is achieved by moving this small intersection point around on the film surface either by scanning the beam in space or by moving the substrate so that the intersection point is changed relative to a stationary beam. These types of exposure using a beam source are well known in the art as direct-write methods. The precise cross-sectional shape of the waveguide core and the width and degree of the graded index region formed at the sides of the core is influenced by the degree of collimation and/or the degree of focusing of the laser light source. Depending on the desired result, the degree of collimation and/or focusing used may vary widely.

After the photopolymerizable composition of the core layer has been polymerized to form the predetermined pattern of the core layer, the pattern is developed to remove the nonimage areas and leave behind the predetermined pattern. Any conventional development method can be used, for example, flushing with a solvent for the unirradiated composition. Such solvents include polar solvents, such as alcohols and ketones. Useful solvents are acetone, methanol, propanol, tetrahydrofuran and ethyl acetate, and for highly fluorinated monomers fluoroether solvents such as those sold by Ausimont under the tradename "Galden®" are suitable.

The buffer and cladding layers need not be fully cured, but only partially polymerized. Partially polymerized means that some acrylate groups are present after polymerization, i.e., not all acrylates are converted to saturated hydrocarbons. This means that more than 0% of the number of acrylate groups, usually more than about 10%, and most suitably more than about 25% of the acrylate groups remain unreacted. The upper limit on the number of unreacted groups depends on the gel point of the monomer(s), which in turn depends on the functionality (the number of acrylate groups per monomer). If the functionality equals an integer, f, then the upper limit for unreacted groups is sufficient to cause gelation and is approximately given by the relation $(1-1/f)$ *100%. As an illustration, the number of remaining unreacted groups for a tetra-acrylate monomer be less than 75%, and the number of remaining unreacted groups for a diacrylate monomer be less than 50%. Partial polymerization of the layers prior to application of the next successive layer allows the layers to intermingle at their interface. This intermingling improves adhesion of the layers and can in some cases be used to control the gradation of index of refraction at the interface.

After all layers have been applied, patterned and developed, as in the case of the core, any remaining unpolymerized acrylates may be subjected to a hard curing by a blanket or overall exposure to actinic radiation such that they are substantially fully polymerized. The cure dose (total radiant energy per unit square of surface) for the final cure step is typically from about 10 to about 500 times the dose employed to partially cure each layer during the preceding fabrication steps. Most suitably the final cure dose is about 100 times this preceding dose. In this manner, the layers intermix at their interfaces during the early fabrication steps to insure good adhesion between the layers by covalent bonding between the materials of the layers, or by intermolecular entanglement between the materials of the layers, or both. Ultimately the desired structure is locked in place with the final curing step so that no further evolution of the structure may take place.

The thusly produced tapered waveguide typically has two ends and an optical fiber may then be attached to at least one of the ends. Techniques for attaching an end of an optical fiber to an end of a waveguide are well known in the art. Typically, an end of the fiber is glued to an end of the tapered waveguide with an index matching adhesive, which are well known.

The following non-limiting examples serve to illustrate the invention.

EXAMPLE 1

A silicon wafer is cleaned and then silane treated to provide adhesion to acrylate formulations. The treated wafer is spin coated with a layer of buffer material comprising a 75:25 weight percent fluorinated diacrylate/fluorinated tetraacrylate composition blended with a photoinitiator. The buffer layer is then partially cured by an overall exposure to actinic radiation. The buffer layer is then spin coated with a layer of core material comprising a 92:8 weight percent fluorinated tetraacrylate/fluoroalkyl acrylate having 8 fluorine atoms, blended with a photoinitiator. This material has been chosen such that it has a higher refractive index than the buffer layer. A 9 micron thick core composition layer is applied onto the buffer layer. The core material is then direct-write exposed to laser light from an argon laser through a convergent lens focused at the lowest portion of the core layer. The core layer material is maintained in an oxygen containing atmosphere. The beam is focused to a "1/e" diameter of 5 microns at the bottom of the core layer, has a Gaussian intensity profile and the exposure dose is adjusted to achieve the desired width and height of the core. The substrate is then held stationary while the beam is then swept with respect to the substrate along a linear path at a gradually increasing velocity from a first position on the substrate to a second position on the substrate. The later exposed area receives a lower exposure dose than the earlier exposed area. The unexposed material is then developed away with a solvent. A waveguide core which is gradually tapered in both its height and width results. The core is then spin coated with a layer of overcladding material comprising fluorinated tetraacrylate blended with a photoinitiator. The overcladding layer is then cured by a final dose, which penetrates to all layers and completes the cure of the top layer as well as the underlying layers.

EXAMPLE 2

Example 1 is repeated except the beam is kept stationary and the substrate is translated along a linear path at a gradually increasing velocity such that the beam intersects the core composition layer between a first position on the substrate to a second position on the substrate. Similar results are noticed.

EXAMPLE 3

A mixture comprising 25 weight percent (wt %) of a fluorinated tetraacrylate F60TA and 75 wt % of a fluorinated diacrylate L-9367 is blended with a fluorinated photoinitiator to form a homogeneous solution such that the final solution contains 2 wt % fluorinated photoinitiator. The solution was then spin coated onto a silicon substrate and cured under a high-pressure mercury-xenon lamp at an irradiance of about 15 mW/cm$^2$ to form a 10 $\mu$m thick buffer. The buffer has a refractive index of 1.313. A core mixture comprising 92 wt % of a fluorinated tetraacrylate F60TA, 7 wt % of a fluorinated diacrylate "C6DIACRY" are blended with 1 wt % of photoinitiator, Darocure® 1173, to form a homogeneous solution. A 9 micron thick core composition layer is applied onto the buffer layer. The core material is then direct write exposed to laser light from an argon laser through a convergent lens focused at the lowest portion of the core layer. The core layer material is maintained in an oxygen atmosphere. The beam is focused to a "1/e" diameter of 5 microns at the bottom of the core layer and has a Gaussian intensity profile. The substrate is then held stationary while the beam is then swept with respect to the substrate along a linear path at a constant velocity from a first position on the substrate to a second position on the substrate. The exposure dose is adjusted to achieve the desired width and height of the core. The exposure dose is gradually decreased in intensity from a first position on the substrate to a second position on the substrate. The later exposed area receives a lower exposure dose than the earlier exposed area. The unexposed material is then developed away with a solvent. A waveguide core which is gradually tapered in both its height and width results. The core is then spin coated with a homogeneous mixture comprising 99 wt % of a fluorinated tetraacrylate F60TA and 1 wt % of a photoinitiator, Daracure® 1173. The solution was then spin coated over the core and cured under a mercury lamp to form a 12-$\mu$m thick overcladding. The overcladding layer is then cured by a final dose, which penetrates to all layers and completes the cure of the top layer as well as the underlying layers.

EXAMPLE 4

Example 3 is repeated except the beam is kept stationary and the substrate is translated along a linear path at a gradually increasing velocity such that the beam intersects the core composition layer between a first position on the substrate to a second position on the substrate. Similar results are obtained.

While the present invention has been particularly shown and described with reference to suitable embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for forming a tapered waveguide on a substrate which comprises
   (a) providing an actinic radiation polymerizable coating composition on a substrate, which coating composition has a bottom surface adjacent to the substrate and a top surface spaced from the bottom surface; said coating composition being at least partially transparent to laser light; said coating composition comprising one or more multifunctional acrylates represented by the formula:

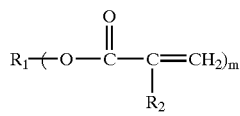

wherein $R_2$ is H or $CH_3$, and $R_1$ is a linkage selected from the group consisting of alkylene, alkylene oxide, arylene oxide, aliphtic polyether, and aliphatic polyester, and m=1–3;
   (b) imagewise exposing in an oxygen containing atmosphere the coating composition to sufficient actinic radiation to at least partially polymerize the coating composition and form a polymerized portion and a non-polymerized portion of the coating composition by directing a converging beam of laser light onto and through the coating composition; said beam of converging laser light having a greater intensity at the bottom surface of the coating composition and a lesser intensity at the top surface of the coating composition, and a gradually decreasing intensity from the bottom surface of the coating composition to the top surface of the coating composition;
   (c) (i) either moving the substrate with respect to the converging beam or moving the converging beam with respect to the substrate, along a linear path; and
      (ii) either conducting the moving at a gradually increasing or gradually decreasing velocity from a first position on the substrate to a second position on the substrate; or gradually increasing or decreasing the intensity of the beam of laser light from a first position on the substrate to a second position on the substrate; and
   (d) developing the coating composition with a liquid developer and removing the non-polymerized portion of the coating composition; thus forming a tapered waveguide on the substrate.

2. The process of claim 1 further comprising the subsequent step of coating the tapered waveguide with an overcladding composition having an index of refraction less than that of the tapered waveguide.

3. The process of claim 1 wherein the surface of the substrate adjacent to the bottom surface of the coating composition comprises an undercladding composition having an index of refraction less than that of the tapered waveguide.

4. The process of claim 1 wherein the beam of converging laser light is formed with an intermediate converging lens.

5. The process of claim 1 wherein the substrate is moved and the beam of converging laser light is held stationary.

6. The process of claim 1 wherein the beam of converging laser light is moved and the substrate is held stationary.

7. The process of claim 1 comprising conducting the moving at a gradually increasing or gradually decreasing velocity from a first position on the substrate to a second position on the substrate.

8. The process of claim 1 comprising gradually increasing or decreasing the intensity of the beam of laser light from a first position on the substrate to a second position on the substrate.

9. The process of claim 1 wherein the coating composition has a substantially uniform thickness.

10. The process of claim 1 wherein the tapered waveguide has at least two ends.

11. The process of claim 1 wherein the tapered waveguide has at least two ends, and further comprising the subsequent step of attaching an optical fiber to at least one of the ends.

12. The process of claim 1 wherein the moving is conducted in a series of steps.

13. The process of claim 1 wherein the moving is conducted continuously.

14. A process for attaching an optical fiber having a core with a first cross sectional area to an optical fiber or waveguide having a core with a second cross sectional area which comprises
   (I) forming a tapered waveguide on a substrate which comprises
      (a) providing an actinic radiation polymerizable coating composition on a substrate, which coating composition has a bottom surface adjacent to the substrate and a top surface spaced from the bottom surface; said coating composition being at least partially transparent to laser light; said coating composition comprising one or more multifunctional acrylates represented by the formula:

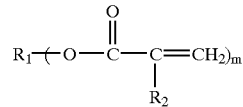

wherein $R_2$ is H or $CH_3$, and $R_1$ is a linkage selected from the group consisting of alkylene, alkylene oxide, arylene oxide, alighatic polyether, and aliphatic polyester, and m=1–3;
      (b) imagewise exposing in an oxygen containing atmosphere the coating composition to sufficient actinic radiation to at least partially polymerize the coating composition and form a polymerized portion and a non-polymerized portion of the coating composition by directing a converging beam of laser light onto and through the coating composition; said beam of converging laser light having a greater intensity at the bottom surface of the coating composition and a lesser intensity at the top surface of the coating composition, and a gradually decreasing intensjty from the bottom surface of the coating composition to the top surface of the coating composition;
      (c) (i) either moving the substrate with respect to the converging beam or moving the converging beam with respect to the substrate, along a linear path; and (ii) either conducting the moving at a gradually increasing or gradually decreasing velocity from a first position on the substrate to a second position on the substrate; or gradually increasing or decreasing the intensity of the beam of laser light from a first position on the substrate to a second position on the substrate;

(d) developing the coating composition with a liquid developer and removing the non-polymerized portion of the coating composition, thus forming a tapered waveguide on the substrate, which waveguide has a first end having a first cross sectional area and a second end having a second cross sectional area; and (II) attaching at least one optical fiber to at least one end of the waveguide.

15. The process of claim 14 comprising attaching an optical fiber having a first cross sectional area to a first end of the waveguide and attaching another optical fiber having a second cross sectional area to a second end of the waveguide.

16. The process of claim 14 further comprising the subsequent step of coating the tapered waveguide with an overcladding composition having an index of refraction less than that of the tapered waveguide.

17. The process of claim 14 wherein the surface of the substrate adjacent to the bottom surface of the coating composition comprises an undercladding composition having an index of refraction less than that of the tapered waveguide.

18. The process of claim 14 wherein the beam of converging laser light is formed with an intermediate converging lens.

19. The process of claim 14 wherein the substrate is moved and the beam of converging laser light is held stationary.

20. The process of claim 14 wherein the beam of converging laser light is moved and the substrate is held stationary.

21. The process of claim 14 comprising conducting the moving at a gradually increasing or gradually decreasing velocity from a first position on the substrate to a second position on the substrate.

22. The process of claim 14 comprising gradually increasing or decreasing the intensity of the beam of laser light from a first position on the substrate to a second position on the substrate.

23. The process of claim 14 wherein the coating composition has a substantially uniform thickness.

24. The process of claim 14 wherein the moving is conducted in a series of steps.

25. The process of claim 14 wherein the moving is conducted continuously.

* * * * *